United States Patent
Kishimoto (10) Patent No.: US 12,281,899 B2
(45) Date of Patent: Apr. 22, 2025

(54) INERTIAL SENSOR

(71) Applicant: Panasonic Intellectual Property Management Co., Ltd., Osaka (JP)

(72) Inventor: Shinichi Kishimoto, Fukui (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 214 days.

(21) Appl. No.: 18/001,990

(22) PCT Filed: Jun. 24, 2021

(86) PCT No.: PCT/JP2021/023941
§ 371 (c)(1),
(2) Date: Dec. 15, 2022

(87) PCT Pub. No.: WO2021/261557
PCT Pub. Date: Dec. 30, 2021

(65) Prior Publication Data
US 2023/0236015 A1     Jul. 27, 2023

(30) Foreign Application Priority Data
Jun. 24, 2020 (JP) ................................ 2020-109128

(51) Int. Cl.
    *G01C 21/16*      (2006.01)
    *G01C 21/18*      (2006.01)
    *G01C 21/20*      (2006.01)

(52) U.S. Cl.
    CPC .......... *G01C 21/166* (2020.08); *G01C 21/18* (2013.01); *G01C 21/183* (2020.08); *G01C 21/20* (2013.01)

(58) Field of Classification Search
    CPC .... G01C 21/166; G01C 21/18; G01C 21/183; G01C 21/20
See application file for complete search history.

(56) References Cited

U.S. PATENT DOCUMENTS

| | | | | |
|---|---|---|---|---|
| 3,545,266 A | * | 12/1970 | Wilson ................. | G01C 21/185 |
| | | | | 73/178 R |
| 2004/0045354 A1 | * | 3/2004 | Lentner ................. | G01P 15/125 |
| | | | | 73/504.04 |

(Continued)

FOREIGN PATENT DOCUMENTS

| | | | |
|---|---|---|---|
| CN | 102607559 A | * | 7/2012 |
| CN | 108444474 A | * | 8/2018 |

(Continued)

OTHER PUBLICATIONS

International Search Report dated Aug. 10, 2021 issued in International Patent Application No. PCT/JP2021/023941, with English translation.

(Continued)

*Primary Examiner* — Mary Cheung
(74) *Attorney, Agent, or Firm* — Rimon P.C.

(57) ABSTRACT

An inertial sensor includes: a plurality of inertial force detection elements each configured to output an output signal corresponding to a detected inertial force; and a processor configured to execute processing relating to the output signal from each of the plurality of inertial force detection elements. The plurality of inertial force detection elements includes: a plurality of main inertial force detection elements configured to detect inertial forces of a plurality of first predetermined axes orthogonal to each other; and a sub-inertial force detection element configured to detect an inertial force of a second predetermined axis which intersects the plurality of first predetermined axes such that the second predetermined axis is orthogonal to none of the plurality of first predetermined axes.

11 Claims, 6 Drawing Sheets

(56) References Cited

U.S. PATENT DOCUMENTS

| | | |
|---|---|---|
| 2008/0174444 A1 | 7/2008 | Noda et al. |
| 2010/0218604 A1 | 9/2010 | Terada |
| 2012/0227491 A1 | 9/2012 | Yamaoka |
| 2015/0033858 A1 | 2/2015 | Hattori et al. |
| 2016/0202287 A1 | 7/2016 | Mori et al. |
| 2017/0356926 A1 | 12/2017 | Hatttori et al. |
| 2018/0195878 A1* | 7/2018 | Roberfroid .......... G01C 21/166 |
| 2019/0277655 A1* | 9/2019 | Masad ................ G01C 25/005 |

FOREIGN PATENT DOCUMENTS

| | | | |
|---|---|---|---|
| CN | 113167587 A * | 7/2021 | ............ G01C 21/16 |
| JP | 2005-241503 A | 9/2005 | |
| JP | 2008-175771 A | 7/2008 | |
| JP | 2010-107518 A | 5/2010 | |
| JP | 4600590 B2 | 12/2010 | |
| JP | 2011-209270 A | 10/2011 | |
| JP | 2012052904 A * | 3/2012 | |
| JP | 2012-251925 A | 12/2012 | |
| JP | 5206409 B2 | 6/2013 | |
| JP | 2017-083479 A | 5/2017 | |
| JP | 2019-174220 A | 10/2019 | |
| WO | 2011/074099 A1 | 6/2011 | |
| WO | 2015/052926 A1 | 4/2015 | |
| WO | 2017/068711 A1 | 4/2017 | |
| WO | 2019/189191 A1 | 10/2019 | |

OTHER PUBLICATIONS

International Search Report dated Sep. 21, 2021 issued in International Patent Application No. PCT/JP2021/023940, with English translation.

* cited by examiner

INERTIAL SENSOR

CROSS REFERENCE TO RELATED APPLICATIONS

This application is the U.S. National Phase under 35 U.S.C. § 371 of International Patent Application No. PCT/JP2021/023941, filed on Jun. 24, 2021 which in turn claims the benefit of Japanese Patent Application No. 2020-109128, filed on Jun. 24, 2020, the entire disclosures of which Applications are incorporated by reference herein.

TECHNICAL FIELD

The present disclosure relates to inertial sensors. Specifically, the present disclosure relates to an inertial sensor for use in various electronic devices.

BACKGROUND ART

Patent Literature 1 discloses an angular velocity sensor which is a type of inertial sensor. The angular velocity sensor of Patent Literature 1 includes a tuning fork-type oscillator whose basic skeleton is made of an elastic material such as a silicon, an IC chip, a package in which the tuning fork-type oscillator and the IC chip are housed and which is made of ceramic, a lid for sealing the package, a holder integrally molded of a resin together with the package sealed with the lid, a chip part, a conductor such as a terminal, and a case covering the holder.

In Patent Literature 1, failure diagnosis for a detector of the tuning fork-type oscillator is made possible to improve the reliability of the angular velocity sensor. However, in the angular velocity sensor of Patent Literature 1, the IC chip is newly provided with a terminal to which a check signal for the failure diagnosis for the detector of the tuning fork-type oscillator is externally supplied. Thus, the angular velocity sensor of Patent Literature 1 has to be changed in its structure on an element level, which complicates the structure as a whole.

CITATION LIST

Patent Literature

Patent Literature 1: JP 2010-107518 A

SUMMARY OF INVENTION

It is an object to provide an inertial sensor having improved reliability while the structure of the inertial sensor is suppressed from being complicated An inertial sensor according to an aspect of the present disclosure includes: a plurality of inertial force detection elements each configured to output an output signal corresponding to a detected inertial force; and a processor configured to execute a process relating to the output signal from each of the plurality of inertial force detection elements. The plurality of inertial force detection elements include: a plurality of main inertial force detection elements configured to detect inertial forces of a plurality of first predetermined axes orthogonal to each other; and a sub-inertial force detection element configured to detect an inertial force of a second predetermined axis which intersects the plurality of first predetermined axes such that the second predetermined axis is orthogonal to none of the plurality of first predetermined axes.

DESCRIPTION OF EMBODIMENTS

An embodiment of the present disclosure will be described hereinafter with reference to the drawings in some cases. The embodiment described below is illustrative for describing the present disclosure and is not intended to limit the present disclosure to the following contents.

The relative positions and other positional relationships comply with the drawings unless otherwise specified. Note that the drawings to be referred to in the following description of the embodiment are all schematic representations, that is, the ratio of the dimensions (including thicknesses) of respective constituent elements illustrated on the drawings does not always reflect their actual dimensional ratio. In addition, the dimensional ratio of each element is not limited to the ratio illustrated in the drawings.

In the present disclosure, an inertial sensor is a sensor that detects an inertial force. The inertial force is expressed in acceleration in the translationally accelerated system and in an angular velocity in the rotating coordinate system. That is, detection of the inertial force means detection of at least one of the acceleration or the angular velocity. In this regard, the inertial sensor is a sensor that detects at least one of the acceleration or the angular velocity.

(1) Embodiment (1-1) Overview

Figure 1:
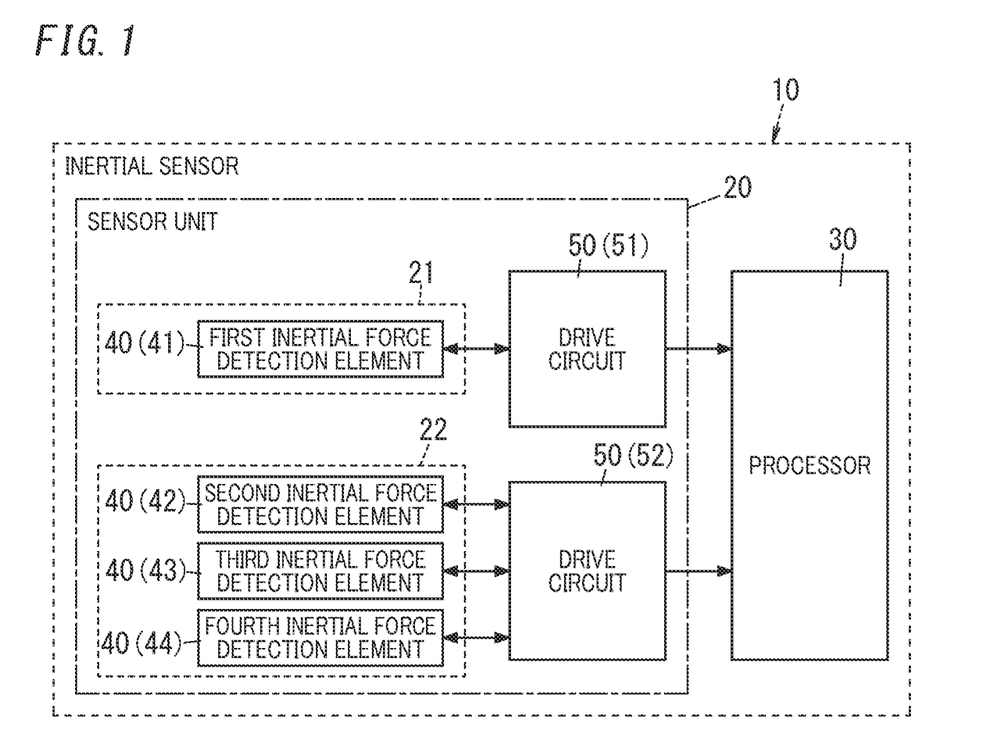
FIG. 1 is a block diagram of an inertial sensor according to an embodiment of the present disclosure.

FIG. 1 is a block diagram of an inertial sensor 10 according to the present embodiment. The inertial sensor 10 includes a plurality of inertial force detection elements 40 and a processor 30. The plurality of inertial force detection elements 40 output output signals corresponding to respective detected inertial forces. The processor 30 executes a process relating to the output signals from the plurality of inertial force detection elements 40. The plurality of inertial force detection elements 40 include a plurality of main inertial force detection elements (second to fourth inertial force detection elements 42 to 44) and a sub-inertial force detection element (first inertial force detection element 41). The plurality of main inertial force detection elements (second to fourth inertial force detection elements 42 to 44) detect inertial forces of a plurality of first predetermined axes (first to third axes A21 to A23, see FIGS. 2 and 3) orthogonal to one another. The sub-inertial force detection element (first inertial force detection element 41) detects an inertial force of a second predetermined axis A11 (see FIGS. 2 and 3) which intersects the plurality of first predetermined axes A21 to A23 such that the second predetermined axis A11 is orthogonal to none of the plurality of first predetermined axes A21 to A23.

In the inertial sensor 10 of the present embodiment, the plurality of inertial force detection elements 40 include the sub-inertial force detection element (first inertial force detection element 41) in addition to the plurality of main inertial force detection elements (second to fourth inertial force detection elements 42 to 44). The plurality of main inertial force detection elements (second to fourth inertial force detection elements 42 to 44) detect the inertial forces of the plurality of first predetermined axes (first to third axes A21 to A23) orthogonal to one another, whereas the sub-inertial force detection element 41 detects the inertial force of the second predetermined axis A11 which intersects the plurality of first predetermined axes (first to third axes A21 to A23) such that the second predetermined axis A11 is orthogonal to none of the plurality of first predetermined axes. Therefore, the inertial force detected by the sub-inertial force detection element (first inertial force detection element 41) can include a component of the respective inertial force detected by each of the plurality of main inertial force detection elements (second to fourth inertial force detection elements 42 to 44). Therefore, the sub-inertial force detection element can be utilized in failure diagnosis for the plurality of main inertial force detection elements, and moreover, in case of failures in the plurality of main inertial force detection elements, the sub-inertial force detection element can be used in place of the plurality of inertial force detection elements. This can be achieved by simply adding the sub-inertial force detection element to the plurality of inertial force detection elements 40. Thus, according to the inertial sensor 10 of the present application, the reliability is improved while the structure of the inertial sensor is suppressed from being complicated (1-2) Configurations A detection system 1 according to the present embodiment will be described hereinafter in detail referring to the drawings.

As shown in FIG. 1, the inertial sensor 10 includes a sensor unit 20 and the processor 30.

The sensor unit 20 includes the plurality of inertial force detection elements 40 and a plurality of drive circuits 50.

The plurality of inertial force detection elements 40 detect inertial forces and output output signals corresponding to the respective inertial forces thus detected. Each of the plurality of inertial force detection elements 40 is a mechano-electrical transduction element (e.g., Micro Electro Mechanical Systems: MEMS). Each of the plurality of inertial force detection elements 40 is an angular velocity detection element. Each of the plurality of inertial force detection elements 40 detects an angular velocity as the inertial force. Since the structure of each inertial force detection element 40 may be a structure of a conventionally well-known angular velocity detection element, the detailed description thereof will be omitted.

The plurality of inertial force detection elements 40 include the first inertial force detection element 41, the second inertial force detection element 42, a third inertial force detection element 43, and a fourth inertial force detection element 44. The first inertial force detection element 41 is the sub-inertial force detection element, and the second to fourth inertial force detection elements 42 to 44 are the main inertial force detection elements.

The second inertial force detection element 42 detects an inertial force of a first axis A21 (see FIGS. 2 and 3) and outputs an output signal corresponding to the inertial force thus detected. In the present embodiment, the second inertial force detection element 42 is an angular velocity detection element. The inertial force of the first axis A21 is an angular velocity around the first axis A21.

The third inertial force detection element 43 detects an inertial force of a second axis A22 (see FIGS. 2 and 3) and outputs an output signal corresponding to the inertial force thus detected. The second axis A22 is orthogonal to the first axis A21. In the present embodiment, the third inertial force detection element 43 is an angular velocity detection element. The inertial force of the second axis A22 is an angular velocity around the second axis A22.

The fourth inertial force detection element 44 detects an inertial force of a third axis A23 (see FIGS. 2 and 3) and outputs an output signal corresponding to the inertial force thus detected. The third axis A23 is orthogonal to each of the first axis A21 and the second axis A22. In the present embodiment, the fourth inertial force detection element 44 is an angular velocity detection element. The inertial force of the third axis A23 is an angular velocity around the third axis A23.

The first to third axes A21 to A23 are a plurality of (in this embodiment, three) first predetermined axes orthogonal to one another.

The first inertial force detection element 41 detects the inertial force of the second predetermined axis A11 (see FIGS. 2 and 3) and outputs an output signal corresponding to the inertial force thus detected. In the present embodiment, the first inertial force detection element 41 is an angular velocity detection element. The inertial force of the second predetermined axis A11 is an angular velocity around the second predetermined axis A11.

Figure 4:
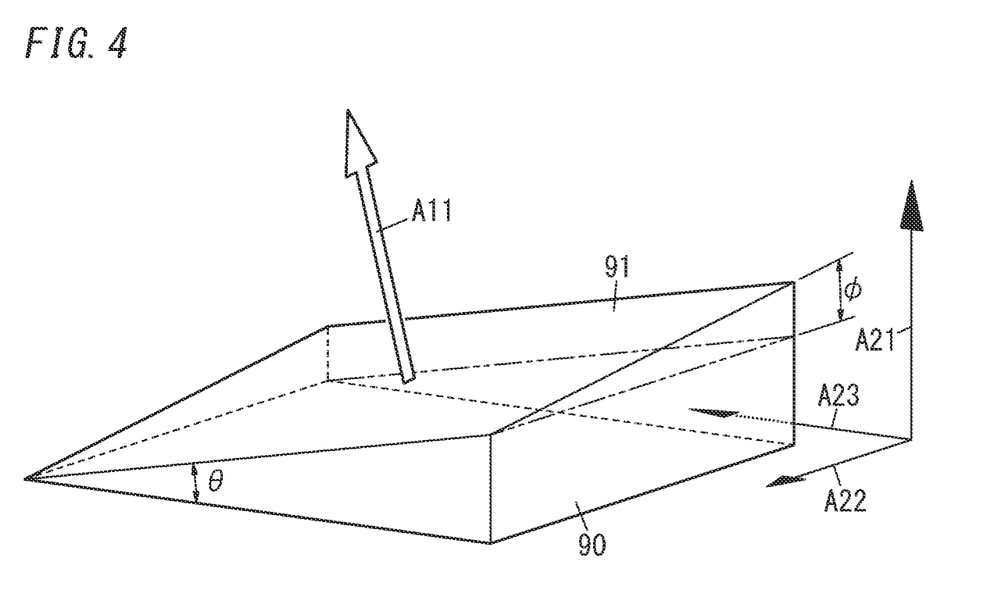
FIG. 4 is a schematic illustrative view of a tilted part of the inertial sensor.
Figure 5:
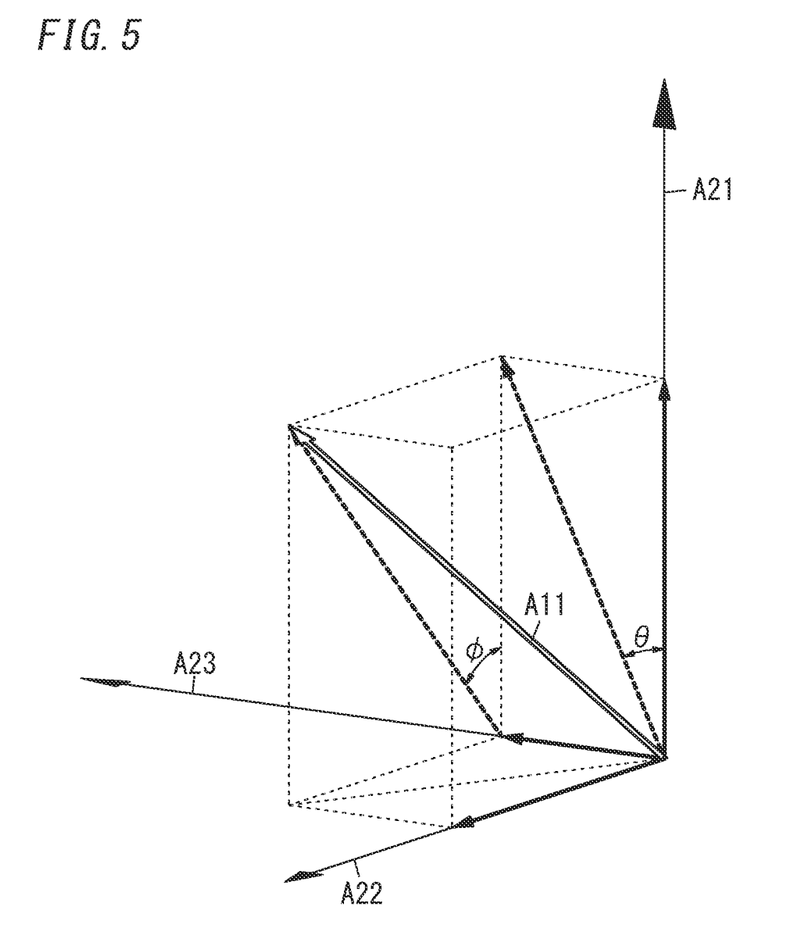
FIG. 5 is an illustrative view of the relationship between a second predetermined axis and first predetermined axes of the inertial sensor.

The second predetermined axis A11 intersects the first to third axes A21 to A23 which are the first predetermined axes such that the second predetermined axis A11 is orthogonal to none of the first to third axes A21 to A23 as shown in FIGS. 4 and 5. In the present embodiment, the second predetermined axis A11 is tilted by an angle θ from the first axis A21 on a plane (plane orthogonal to the second axis A22) including the first axis A21 and the third axis A23 as shown in FIG. 5. The second predetermined axis A11 is tilted by an angle φ from the first axis A21 on a plane (plane orthogonal to the third axis A23) including the first axis A21 and the second axis A22 as shown in FIG. 5. Thus, the inertial force of the second predetermined axis A11 can contain components of the inertial forces of the first to third axes A21 to A23.

The plurality of inertial force detection elements 40 (41 to 44) have the same detection ranges. The detection range is a detection range of the inertial force (the angular velocity in the present embodiment). In particular, in the present embodiment, the detection range is intended to a range in which a change in the output signal of each inertial force detection element 40 in response to the change in the inertial force is regarded as having linearity. For example, the detection range of each inertial force detection element 40 is greater than or equal to 0 and less than or equal to 200 [deg/sec].

The plurality of inertial force detection elements 40 (41 to 44) have the same sensitivities. The sensitivity is, for example, the amount of change in the output with respect to a unit input. As for the angular velocity, the sensitivity is the amount of change in the output signal when the angular velocity changes by 1 "deg/sec". The higher the sensitivity, the easier a minute change in the angular velocity is detected.

The plurality of inertial force detection elements 40 (41 to 44) have the same bias stabilities. The bias stability is, for example, the magnitude of the variation in the output signal when the inertial force is zero (at rest). High bias stability reduces erroneous detection when the inertial force is zero.

The plurality of drive circuits 50 give the output signals from the plurality of inertial force detection elements 40 to the processor 30. In the present embodiment, the plurality of drive circuits 50 drive the plurality of inertial force detection elements 40 to cause the plurality of inertial force detection elements 40 to output output signals corresponding to the respective inertial force thus detected. Each of the plurality of drive circuits 50 is, for example, an Application Specific Integrated Circuit (ASIC). Since the structure of each drive circuit 50 may be the structure of a drive circuit for conventionally well-known angular velocity detection elements, the detailed description thereof will be omitted.

Figure 2:
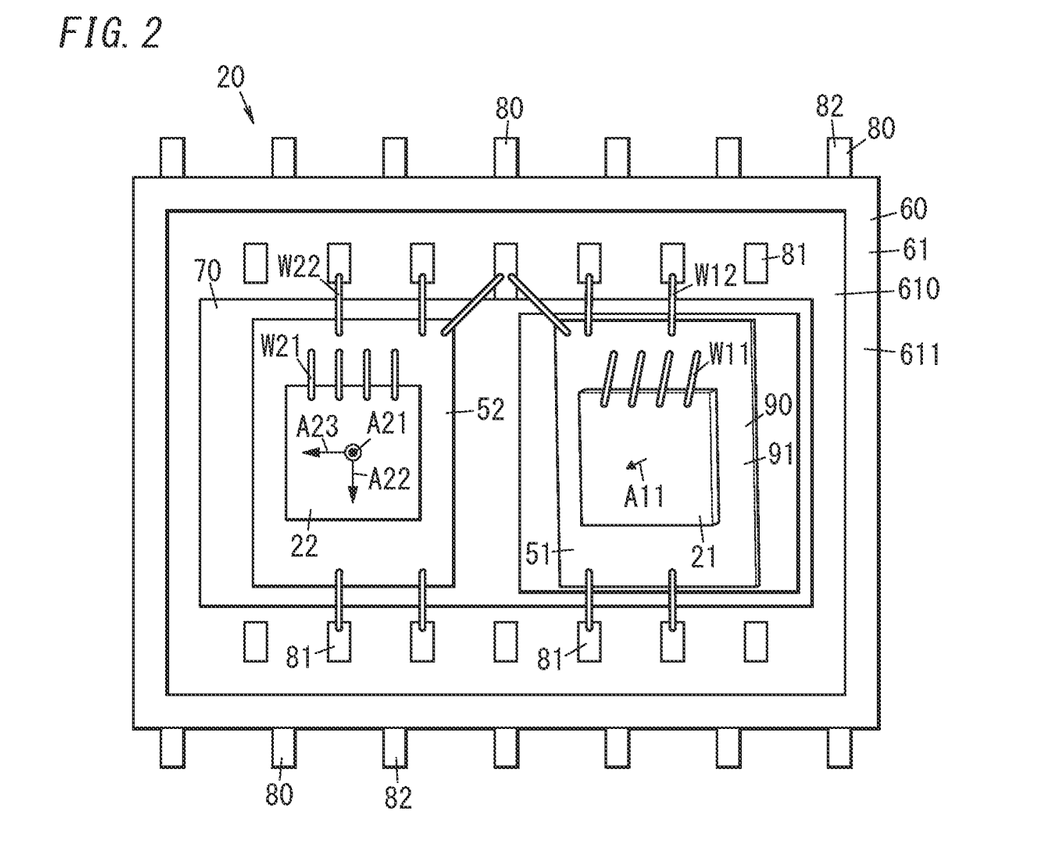
FIG. 2 is a schematic plan view of the inertial sensor.
Figure 3:
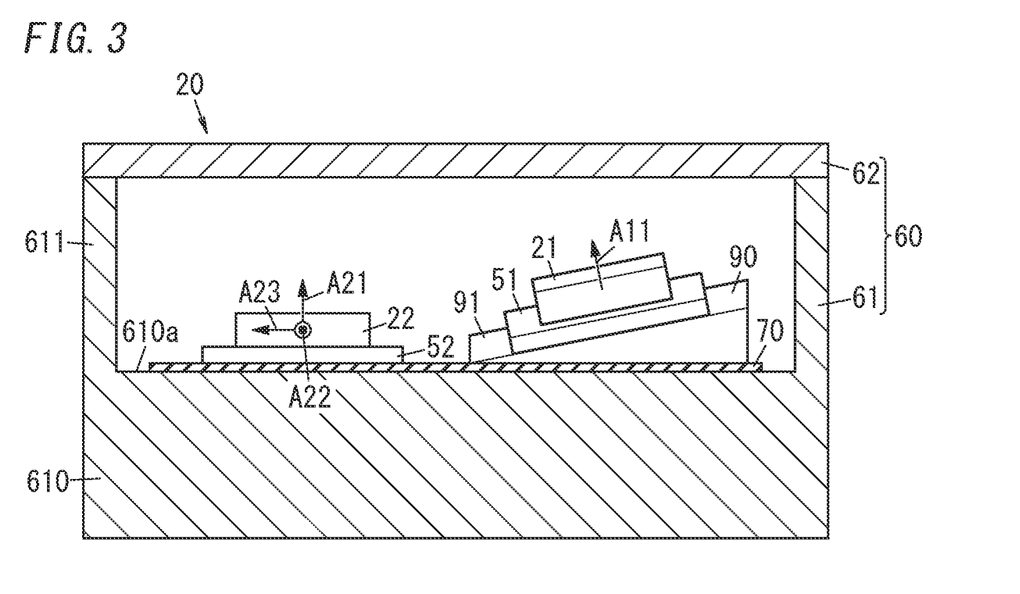
FIG. 3 is a schematic sectional view of the inertial sensor.

The plurality of drive circuits 50 include two drive circuits 51 and 52. The drive circuit 51 acquires the output signal from the first inertial force detection element 41 and gives the output signal to the processor 30. The drive circuit 52 acquires the output signals from the second to fourth inertial force detection elements 42 to 44 and gives the output signals to the processor 30. As shown in FIGS. 2 and 3, each of the two drive circuits 51 and 52 is generally rectangular plate-shaped. The drive circuit 51 corresponds to a first drive circuit, and the drive circuit 52 corresponds to a second drive circuit. The output signal which the drive circuit 51 acquires from the first inertial force detection element 41 corresponds to a first output signal. The output signals which the drive circuit 52 acquires from the second to fourth inertial force detection elements 42 to 44 correspond to second output signals.

As shown in FIGS. 1 to 3, the sensor unit 20 includes two sensor elements 21 and 22. The sensor element 21 includes the first inertial force detection element 41 of the plurality of inertial force detection elements 40. The sensor element 22 includes the second inertial force detection element 42, the third inertial force detection element 43, and the fourth inertial force detection element 44 of the plurality of inertial force detection elements 40. The second inertial force detection element 42, the third inertial force detection element 43, and the fourth inertial force detection element 44 are integrated into one piece. Thus, the plurality of main inertial force detection elements are elements integrally formed as one piece. As shown in FIGS. 2 and 3, the two sensor elements 21 and 22 are generally rectangular plate-shaped.

The sensor unit 20 further includes a package 60 as shown in FIGS. 2 and 3.

The package 60 houses the two sensor elements 21 and 22 and the two drive circuits 51 and 52. The package 60 includes a base 61 and a cover 62. The two sensor elements 21 and 22 and the two drive circuits 51 and 52 are housed in a space between the base 61 and the cover 62. In FIG. 2, the cover 62 is omitted.

The base 61 has an arrangement surface on which the two sensor elements 21 and 22 and the two drive circuits 51 and 52 are arranged. The arrangement surface includes a main arrangement surface 610*a* and a sub-arrangement surface 91 which are in different orientations. The main arrangement surface 610*a* and the sub-arrangement surface 91 will be described later.

The base 61 includes a base part 610 and a sidewall part 611. Both the base part 610 and the sidewall part 611 are electrically insulating. The base part 610 and the sidewall part 611 are formed as a continuous one piece. For example, the base part 610 and the sidewall part 611 are a molded article made of an electrically insulating resin. The base part 610 has the main arrangement surface 610*a* constituting part of the arrangement surface. The base part 610 has a rectangular plate shape. The base part 610 has a surface constituting the main arrangement surface 610*a*. The surface is one surface in a thickness direction. The sidewall part 611 protrudes from the outer periphery of the one surface in the thickness direction defined with respect to the base part 610. The sidewall part 611 has a rectangular frame shape. The cover 62 is attached to the sidewall part 611 so as to face the main arrangement surface 610*a* of the base part 610. The cover 62 has a rectangular plate shape. The cover 62 is electrically insulating. For example, the cover 62 is a molded article made of an electrically insulating resin.

The base 61 further includes an anti-vibration portion 70, a plurality of connecting members 80, and a tilted part 90.

The anti-vibration portion 70 is arranged on the main arrangement surface 610*a* of the base 61. In particular, the anti-vibration portion 70 lies between the main arrangement surface 610*a* and the two sensor elements 21 and 22 and the two drive circuits 51 and 52. The anti-vibration portion 70 is provided to reduce the influence of a vibration outside the package 60 on the two sensor elements 21 and 22. This reduces noise generated in the inertial sensor 10. For example, the anti-vibration portion 70 is made of an elastic and electrically insulating material.

The plurality of connecting members 80 are used for electrical connection of at least the drive circuits 51 and 52 to the processor 30. Each of the plurality of connecting members 80 includes an electrode portion 81 and a terminal portion 82. The plurality of connecting members 80 are embedded in the base 61. In each connecting member 80, the electrode portion 81 is exposed at the main arrangement surface 610*a* of the base part 610, the terminal portion 82 protrudes outward from a side surface of the base part 610. The electrode portions 81 of the plurality of connecting members 80 are used for electrical connection to the drive circuits 51 and 52. The terminal portions 82 of the plurality of connecting members 80 are used for electrical connection to the processor 30. In the present embodiment, the plurality of connecting members 80 are held by the base 61 by insert molding.

The tilted part 90 is on a surface, constituting the main arrangement surface 610*a*, of the base 61. In the present embodiment, the tilted part 90 is on the anti-vibration portion 70 on the base 61. The tilted part 90 has a tilted surface constituting the sub-arrangement surface 91. The sub-arrangement surface 91 constitutes part of the arrangement surface.

The two sensor elements 21 and 22 and the two drive circuits 51 and 52 are arranged on the arrangement surface of the base 61. As shown in FIGS. 2 and 3, the two drive circuits 51 and 52 are arranged on the anti-vibration portion 70 on the arrangement surface of the base 61. In the present embodiment, the two drive circuits 51 and 52 are aligned along the length direction (left/right direction in FIG. 2) of the base 61. The drive circuit 52 is arranged on the anti-vibration portion 70 on the main arrangement surface 610*a*. The sensor element 22 is arranged on an opposite side of the drive circuit 52 from the main arrangement surface 610*a*. The sensor element 22 is connected in electrical connection to the drive circuit 52 by one or more conductive wires W21. The drive circuit 52 is connected in electrical connection to corresponding one or more of the electrode portions 81 respectively by one or more conductive wires W22. The drive circuit 51 is arranged on the sub-arrangement surface 91. The sensor element 21 is arranged on an opposite side of the drive circuit 51 from the sub-arrangement surface 91. The sensor element 21 is connected in electrical connection to the drive circuit 51 by one or more conductive wires W11. The drive circuit 51 is connected in electrical connection to corresponding one or more of the electrode portions 81 respectively by one or more conductive wires W12.

The sensor element 22 is on the main arrangement surface 610a, and the sensor element 21 is on the sub-arrangement surface 91. The sensor element 22 includes the second to fourth inertial force detection elements 42 to 44, which are the plurality of main inertial force detection elements, and therefore, the plurality of inertial force detection elements are on the main arrangement surface 610a. The sensor element 21 includes the first inertial force detection element 41, which is the sub-inertial force detection element, and therefore, the sub-inertial force detection element is on the sub-arrangement surface 91.

As shown in FIGS. 2 and 3, the first axis A21 of the second inertial force detection element 42 is orthogonal to the main arrangement surface 610a. The second axis A22 and the third axis A23 are orthogonal to the first axis A21, and therefore, the main arrangement surface 610a is a plane including the second axis A22 and the third axis A23. The second axis A22 of the third inertial force detection element 43 is along the width direction of the base 61 (up/down direction in FIG. 2). In particular, the second axis A22 of the third inertial force detection element 43 is orthogonal to a direction in which the two sensor elements 21 and 22 (two drive circuits 51 and 52) are aligned (left/right direction in FIG. 2). The third axis A23 of the fourth inertial force detection element 44 is along the length direction of the base 61 (left/right direction in FIG. 2). In particular, the third axis A23 of the fourth inertial force detection element 44 is orthogonal to a direction in which the two sensor elements 21 and 22 (two drive circuits 51 and 52) are aligned (left/right direction in FIG. 2).

As shown in FIG. 4, the second predetermined axis A11 of the first inertial force detection element 41 is orthogonal to the sub-arrangement surface 91. The sub-arrangement surface 91 is tilted by an angle θ with respect to a plane (main arrangement surface 610a) including the second axis A22 and the third axis A23 when viewed from the second axis A22. Moreover, the sub-arrangement surface 91 is titled by an angle φ with respect to the plane (main arrangement surface 610a) including the second axis A22 and the third axis A23 when viewed from the third axis A23. Thus, the second predetermined axis A11 is tilted by the angle θ from the first axis A21 on the plane (plane orthogonal to the second axis A22) including the first axis A21 and the third axis A23. The second predetermined axis A11 is tilted by the angle φ from the first axis A21 on the plane (plane orthogonal to the third axis A23) including the first axis A21 and the second axis A22.

The processor 30 executes a process relating to the output signals from the plurality of inertial force detection elements 40. The processor 30 acquires, from the drive circuits 51 and 52, the output signals from the plurality of inertial force detection elements 40. The processor 30 acquires the output signals from the plurality of inertial force detection elements 40 at a predetermined interval. The predetermined interval is at least accordingly set in accordance with the sensitivities and the like of the plurality of inertial force detection elements 40.

The processor 30 obtains the inertial force of the first predetermined axis (first axis A21) with reference to the output signal from the second inertial force detection element 42. The processor 30 obtains the inertial force of the first predetermined axis (the second axis A22) with reference to the output signal from the third inertial force detection element 43. The processor 30 obtains the inertial force of the first predetermined axis (the third axis A23) with reference to the output signal from the fourth inertial force detection element 44. In sum, the processor 30 obtains the inertial forces of the three first predetermined axes (the first to third axes A21 to A23) orthogonal to one another (angular velocities around the first to third axes A21 to A23), that is, the angular velocities of the three axis with reference to the output from the sensor element 22.

The processor 30 obtains the inertial force of the second predetermined axis A11 with reference to the output signal from the first inertial force detection element 41. In sum, the processor 30 obtains the inertial force of the second predetermined axis A11 (angular velocity around the second predetermined axis A11), that is, the angular velocity of the one axis with reference to the output from the sensor element 21.

The processor 30 executes a diagnostic process. The diagnostic process is a process of performing failure diagnosis for the plurality of main inertial force detection elements with reference to the output signal from the sub-inertial force detection element. That is, the processor 30 performs failure diagnosis for the second to fourth inertial force detection elements 42 to 44 with reference to the output signal of the first inertial force detection element 41. As described above, the inertial force of the second predetermined axis A11 can include components of the inertial forces of the first to third axes A21 to A23. Thus, when the angles θ and φ are known, the inertial force of each of the first to third axes A21 to A23 is obtainable from the inertial force of the second predetermined axis A11. When none of the second to fourth inertial force detection elements 42 to 44 has a failure, the inertial forces of the second to fourth inertial force detection elements 42 to 44 each obtained from the inertial force of the second predetermined axis A11 obtained from the output signal from the first inertial force detection element 41 are respectively equal to the inertial forces obtained from the output signals from the second to fourth inertial force detection elements 42 to 44. Thus, when a component of a specific first predetermined axis of the plurality of first predetermined axes (first to third axes A21 to A23) obtainable from the inertial force based on the output signal from the sub-inertial force detection element (first inertial force detection element 41) does not match an inertial force based on an output signal from a specific main inertial force detection element corresponding to the specific first predetermined axis and included in the plurality of main inertial force detection elements (second to fourth inertial force detection elements 42 to 44), the processor 30 determines that the specific main inertial force detection element has a failure. Specifically, if the inertial force of the first axis A21 obtained from the output signal (inertial force of the second predetermined axis A11) from the first inertial force detection element 41 does not match the inertial force from the second inertial force detection element 42 corresponding to the first axis A21, the processor 30 determines the occurrence of a failure in the second inertial force detection element 42. If the inertial force of the second axis A22 obtained from the output signal (inertial force of the second predetermined axis A11) from the first inertial force detection element 41 does not match the inertial force from the third inertial force detection element 43 corresponding to the second axis A22, the processor 30 determines the occurrence of a failure in the third inertial force detection element 43. If the inertial force of the third axis A23 obtained from the output signal (inertial force of the second predetermined axis A11) from the first inertial force detection element 41 does not match the inertial force from the fourth inertial force detection element 44 corresponding to the third axis A23, the processor 30 determines the occurrence of a failure in the fourth inertial force detection element 44. If the occurrence of a failure in any of the main inertial force detection elements (second to fourth inertial force detection elements 42 to 44) is determined as a result of the diagnostic process, the processor 30 issues a notification of the occurrence of the failure.

Note that as a method of performing the failure diagnosis, the inertial forces of the plurality of main inertial force detection elements obtained from the inertial force based on the output signal from the sub-inertial force detection element are compared with the inertial forces based on the output signals from the main inertial force detection elements, but instead of this method, the inertial force based on the output signal from the sub-inertial force detection element may be compared with a combined inertial force obtained by combining the inertial forces based on the output signals from the plurality of main inertial force detection elements. For example, when the angles θ and φ are known, a component of the second predetermined axis A11 can be obtained from a combined inertial force obtainable from the inertial forces of the first to third axes A21 to A23. When none of the second to fourth inertial force detection elements 42 to 44 has a failure, the inertial force of the second predetermined axis A11 obtained from the output signal from the first inertial force detection element 41 is equal to the component of the second predetermined axis A11 of the combined inertial force obtained from the output signals from the second to fourth inertial force detection elements 42 to 44. If the component of the second predetermined axis A11 of the combine inertial force from the second to fourth inertial force detection elements 42 to 44 does not match the inertial force of the second predetermined axis A11 obtained from the output signal from the first inertial force detection element 41, the processor 30 determines the occurrence of a failure in any of the plurality of main inertial force detection elements (second to fourth inertial force detection elements 42 to 44). If the occurrence of a failure in any of the main inertial force detection elements is determined as a result of the diagnostic process, the processor 30 issues a notification of the occurrence of the failure. In this case, however, the output signals have to be output from the plurality of main inertial force detection elements before the inertial forces are combined with each other.

As described above, if the processor 30 determines, as a result of the diagnostic process, that none of the plurality of main inertial force detection elements has a failure, the processor 30 outputs the inertial forces of the plurality of first predetermined axes (first to third axes A21 to A23) obtained with reference to the output signals from the second to fourth inertial force detection elements 42 to 44. If the processor 30 determines, as a result of the diagnostic process, the occurrence of a failure in any of the plurality of main inertial force detection elements, the processor issues a notification of the occurrence of the failure.

(2) Variations

The embodiment of the present disclosure is not limited to the embodiment described above. The embodiment described above may be readily modified in various manners depending on a design choice or any other factor without departing from the scope of the present disclosure. Variations of the embodiment described above will be enumerated below. The variations described below are applicable accordingly in combination.

Figure 6:
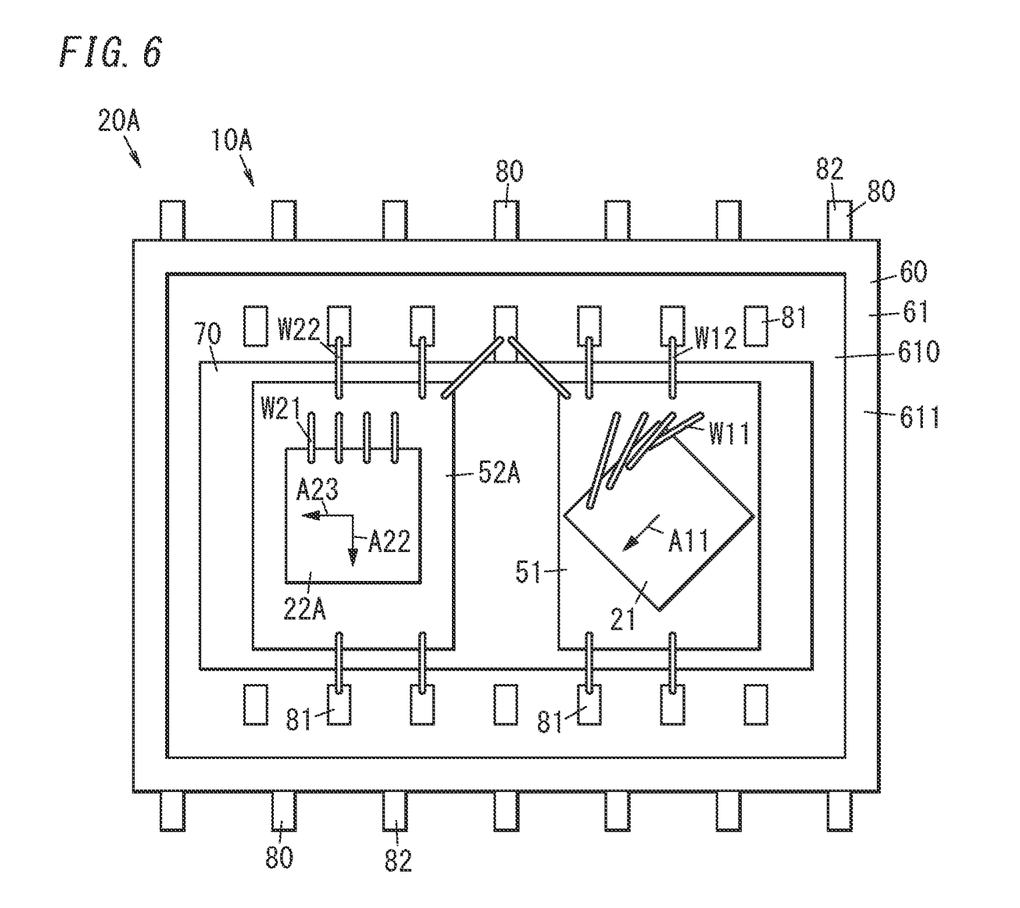
FIG. 6 is a schematic plan view of an inertial sensor of a variation.

FIG. 6 shows an inertial sensor 10A of a variation. The inertial sensor 10A includes a sensor unit 20A and a processor 30 (see FIG. 1).

The sensor unit 20A includes a plurality of inertial force detection elements and a plurality of drive circuits 50 (51 and 52A).

The plurality of inertial force detection elements include two main inertial force detection elements and a sub-inertial force detection element. Also in this variation, the plurality of inertial force detection elements are angular velocity detection elements.

The two main inertial force detection elements detect inertial forces of a plurality of first predetermined axes (second and third axes A22 and A23, see FIG. 6) orthogonal to each other. The sub-inertial force detection element detects an inertial force of a second predetermined axis A11 which intersects the plurality of first predetermined axes A22 and A23 such that the second predetermined axis A11 (see FIG. 6) is orthogonal to none of the first predetermined axes A22 and A23.

The plurality of drive circuits 50 includes the two drive circuits 51 and 52A. The drive circuit 52A acquires output signals from the two main inertial force detection elements and gives the output signals to the processor 30. The drive circuit 52A is generally rectangular plate-shaped.

A sensor element 21 includes the sub-inertial force detection element. A sensor element 22A includes the two main inertial force detection elements. The two main inertial force detection elements are integrated into one piece. As shown in FIG. 6, the two sensor elements 21 and 22A are generally rectangular plate-shaped.

The two sensor elements 21 and 22A and the two drive circuits 51 and 52A are arranged on an arrangement surface of a base 61. As shown in FIG. 6, the two drive circuits 51 and 52A are arranged on an anti-vibration portion 70 on the arrangement surface of the base 61. The two drive circuits 51 and 52A are aligned along a length direction (left/right direction in FIG. 6) of the base 61. The drive circuits 51 and 52A are arranged on the anti-vibration portion 70 on the arrangement surface of the base 61.

The sensor element 22A is arranged on an opposite side of the drive circuit 52A from the arrangement surface. The sensor element 22A is connected in electrical connection to the drive circuit 52A by one or more conductive wires W21. The drive circuit 52A is connected in electrical connection to corresponding one or more of the electrode portions 81 respectively by one or more conductive wires W22. The sensor element 21 is arranged on an opposite side of the drive circuit 51 from the arrangement surface. The sensor element 21 is connected in electrical connection to the drive circuit 51 by one or more conductive wires W11. The drive circuit 51 is connected in electrical connection to corresponding one or more of the electrode portions 81 respectively by one or more conductive wires W12.

As shown in FIG. 6, the second and third axes A22 and A23 which are the first predetermined axes of the two main inertial force detection elements are included in the arrangement surface. The second axis A22 is along a width direction (up/down direction in FIG. 6) of the base 61. In particular, the second axis A22 is orthogonal to a direction (left/right direction in FIG. 6) in which the two sensor elements 21 and 22A (two drive circuits 51 and 52A) are aligned. The third axis A23 is along a length direction (left right direction in FIG. 6) of the base 61. In particular, the third axis A23 is along the direction (left/right direction in FIG. 6) in which the two sensor elements 21 and 22A (two drive circuits 51 and 52A) are aligned.

In the sensor element 21, the second predetermined axis A11 of the sub-inertial force detection element is orthogonal to the thickness of the sensor element 21. In addition, the sensor element 21 is arranged on the arrangement surface such that the second predetermined axis A11 is included in the arrangement surface and intersects the second axis A22 and the third axis A23 such that the second predetermined axis A11 is orthogonal to none of the second axis A22 and the third axis A23 (see FIG. 6). In an example, the second predetermined axis A11 is in the arrangement surface and intersects each of the second axis A22 and the third axis A23 at 45 degrees.

In the variation, the processor 30 (see FIG. 1) obtains the inertial forces of the first predetermined axes (the second axis A22 and the third axis A23) based on the output signals from the two main inertial force detection elements. In sum, the processor 30 obtains the inertial forces of the two first predetermined axes (the second and third axes A22 and A23) orthogonal to each other (angular velocities around the second and third axes A22 and A23), that is, angular velocities of the two axes with reference to an output from the sensor element 22A. The processor 30 obtains the inertial force of the second predetermined axis A11 with reference to the output signal from the sub-inertial force detection element. In sum, the processor 30 obtains the inertial force of the second predetermined axis A11 (angular velocity around the second predetermined axis A11), that is, an angular velocity of the one axis with reference to an output from the sensor element 21.

As described above, the inertial force of the second predetermined axis A11 can include components of the inertial forces of the second and third axes A22 and A23. Thus, if the angle of the second predetermined axis A11 with respect to the second and third axes A22 and A23 is known, a component of the second predetermined axis A11 is obtainable from a combined inertial force obtained from the inertial forces of the second and third axes A22 and A23. Therefore, the processor 30 can perform the failure diagnosis for the two main inertial force detection elements with reference to the output signal from the sub-inertial force detection element.

In a similar manner to the embodiment described above, the processor 30 executes the diagnostic process, and if the processor 30 determines, as a result of the diagnostic process, that none of the two main inertial force detection elements has a failure, the processor 30 outputs the inertial forces of the plurality of first predetermined axes (second and third axes A22 and A23) obtained with reference to the output signals from the two main inertial force detection elements. If the processor 30 determines, as a result of the diagnostic process, the occurrence of a failure in any of the two main inertial force detection elements, the processor 30 issues a notification of the occurrence of the failure.

Next, some other variations will be enumerated.

In a variation, the first predetermined axes are not limited to the first to third axes A21 to A23. The first predetermined axes are not limited to the first axis A21, the second axis A22, and the third axis A23 but may be axes of arbitrary angles.

In a variation, at least two of the plurality of inertial force detection elements 40 may have detection ranges different from each other. For example, the first inertial force detection element 41 may have a detection range which is different from the detection ranges of the second to fourth inertial force detection elements 42 to 44.

In a variation, at least two of the plurality of inertial force detection elements 40 may have sensitivities different from each other. For example, the first inertial force detection element 41 may have sensitivity different from the sensitivities of the second to fourth inertial force detection elements 42 to 44.

In a variation, at least two of the plurality of inertial force detection elements 40 may have bias stabilities different from each other. For example, the first inertial force detection element 41 may have a bias stability different from the bias stabilities of the second to fourth inertial force detection elements 42 to 44.

In a variation, the processor 30 may acquire the output signals from the plurality of inertial force detection elements 40 at intervals different from each other. For example, the processor 30 may acquire the output signal from the first inertial force detection element 41 at an interval different from the intervals at which the output signals are acquired from the second to fourth inertial force detection elements 42 to 44.

In a variation, each of the plurality of inertial force detection elements 40 may be an acceleration detection element. Each of the plurality of inertial force detection elements 40 detects an acceleration as the inertial force. The structure of each inertial force detection element may be a structure of a conventionally well-known acceleration detection element, and thus, the detailed description thereof will be omitted.

In a variation, the plurality of inertial force detection elements 40 may include a plurality of angular velocity detection elements and a plurality of acceleration detection elements. The plurality of angular velocity detection elements may include two or more angular velocity detection elements that detect angular velocity around the same axis. The plurality of acceleration detection elements may include two or more acceleration detection elements that detect accelerations of the same axes.

In a variation, the plurality of main inertial force detection elements do not necessarily have to be integrated into one sensor element. Each of the plurality of sensor elements may include a single inertial force detection element.

In a variation, each of the drive circuit 50 is not limited to an ASIC but may be, for example, a Field-Programmable Gate Array (FPGA) or may be configured by one or more processors and one or more memory elements. One drive circuit 50 may control a plurality of sensor elements.

In a variation, in the inertial sensor 10, the number of the main inertial force detection elements is not particularly limited and is any number that is at least two or grater, and the number of the sub-inertial force detection elements is not particularly limited and is any number that is at least one or greater. The plurality of inertial force detection elements 40 may include a plurality of combinations of the plurality of inertial force detection elements and sub-inertial force detection elements.

In a variation, the sub-inertial force detection element may be utilized in place of a main inertial force detection element having a failure of the plurality of main inertial force detection elements. When a specific main inertial force detection element of the plurality of main inertial force detection elements has a failure, the processor 30 may output, based on the output signal from the sub-inertial force detection element, the inertial force of the first predetermined axis corresponding to the specific main inertial force detection element of the plurality of first predetermined axes. For example, if it is determined, as a result of the diagnostic process, that the second inertial force detection element 42 has a failure, the processor 30 outputs the angular velocity around the first axis A21 obtained from the first inertial force detection element 41 instead of the angular velocity around the first axis A21 obtained from the second inertial force detection element 42. Therefore, even in case of a failure of the main inertial force detection element, the inertial sensor 10 can continue operating. Thus, the processor 30 may obtain an inertial force of at least one of the plurality of first predetermined axes with reference to the output signal from the sub-inertial force detection element.

In a variation, the plurality of inertial force detection elements 40 may include a plurality of sub-inertial force detection elements. The plurality of sub-inertial force detection elements may have different second predetermined axes. The plurality of sub-inertial force detection elements can include a sub-inertial force detection element for failure determination and a sub-inertial force detection element for a replacement for a main inertial force detection element.

(3) Aspects

As can be seen from the embodiment and the variations described above, the present disclosure includes the following aspects. In the following description, reference signs in parentheses are added only to clarify the correspondence relationship to the embodiment.

A first aspect is an inertial sensor (10; 10A) and includes a plurality of inertial force detection elements (40) each configured to output an output signal corresponding to a detected inertial force; and a processor (30) configured to execute a process relating to the output signal from each of the plurality of inertial force detection elements (40). The plurality of inertial force detection elements (40) include a plurality of main inertial force detection elements (42 to 44) and a sub-inertial force detection element (41). The plurality of main inertial force detection elements (42 to 44) are configured to detect inertial forces of a plurality of first predetermined axes (A21 to A23) orthogonal to each other. The sub-inertial force detection element (41) is configured to detect an inertial force of a second predetermined axis (A11) which intersects the plurality of first predetermined axes (A21 to A23) such that the second predetermined axis (A11) is orthogonal to none of the plurality of first predetermined axes (A21 to A23). This aspect enables the reliability to be improved while the structure is suppressed from being complicated.

A second aspect is an inertial sensor (10) referring to the first aspect. In the second aspect, the inertial sensor (10) further includes a base (61) having an arrangement surface (610a, 91). The arrangement surface (610a, 91 includes a main arrangement surface (610a) and a sub-arrangement surface (91) which are in different orientations. The plurality of main inertial force detection elements (42 to 44) are on the main arrangement surface (610a). The sub-inertial force detection element (41) is on the sub-arrangement surface (91). This aspect facilitates setting of the second predetermined axis (A11).

A third aspect is an inertial sensor (10) referring to the second aspect. In the third aspect, the base (61) includes a base part (610) having a surface constituting the main arrangement surface (610a) and a tilted part (90) on the surface, the tilted part (90) having a tilted surface constituting the sub-arrangement surface (91). This aspect facilitates setting of the second predetermined axis (A11).

A fourth aspect is an inertial sensor (10) referring to any one of the first to third aspects. In the fourth aspect, the plurality of first predetermined axes (A21 to A23) further includes a third axis (A23) orthogonal to each of the first axis (A21) and the second axis (A22). According to this aspect, inertial forces of the three axes are obtainable from the main inertial force detection elements.

A fifth aspect is an inertial sensor (10; 10A) referring to any one of the first to fourth aspects. In the fifth aspect, the processor (30) is configured to perform failure diagnosis for the plurality of main inertial force detection elements (42 to 44) with reference to an output signal from the sub-inertial force detection element (41). This aspect enables the reliability to be improved.

A sixth aspect is an inertial sensor (10; 10A) referring to the fifth aspect. In the sixth aspect, the processor (30) is configured to, when a component of a specific first predetermined axis of the plurality of first predetermined axes (A21 to A23) obtainable from an inertial force based on the output signal from the sub-inertial force detection element (41) does not match an inertial force based on an output signal from a specific main inertial force detection element corresponding to the specific first predetermined axis and included in the plurality of main inertial force detection elements (42 to 44), determine that the specific main inertial force detection element has a failure. This aspect enables the reliability to be improved.

A seventh aspect is an inertial sensor (10; 10A) referring to the fifth aspect. In the seventh aspect, the processor (30) is configured to determine that at least one of the plurality of main inertial force detection elements (42 to 44) has a failure when an inertial force based on the output signal from the sub-inertial force detection element (41) does not match a component of a combined inertial force obtained by combining a plurality of output signals from the plurality of main inertial force detection elements (42 to 44). This aspect enables the reliability to be improved.

An eighth aspect is an inertial sensor (10; 10A) referring to any one of the first to seventh aspects. In the eighth aspect, the processor (30) is configured to, when a specific main inertial force detection element of the plurality of main inertial force detection elements (42 to 44) has a failure, obtain an inertial force of a first predetermined axis corresponding to the specific main inertial force detection element and included in the plurality of first predetermined axes (A21 to A23) with reference to an output signal from the sub-inertial force detection element (41). This aspect enables the reliability to be improved.

A ninth aspect is an inertial sensor (10; 10A) referring to any one of the first to eighth aspects. In the ninth aspect, each of the plurality of inertial force detection elements (40) is a mechano-electrical transduction element. This aspect enables the inertial sensor (10; 10A) to be downsized.

A tenth aspect is an inertial force sensor (10; 10A) referring to any one of the first to ninth aspects. In the tenth aspect, the inertial sensor (10; 10A) further includes a plurality of drive circuits (50) each configured to give the output signal from a corresponding one of the plurality of inertial force detection elements (40) to the processor. The plurality of drive circuits (50) includes a first drive circuit (51) configured to acquire a first output signal from the sub-inertial force detection element (41) and give the first output signal to the processor (30) and a second drive circuit (52; 52A) configured to acquire second output signals from the plurality of main inertial force detection elements (42 to 44) and give the second output signals to the processor (30). The processor (30) is configured to execute a process relating to the first output signal and the second output signals as the process relating to the output signal.

An eleventh aspect is an inertial force sensor (10; 10A) referring to the tenth aspects. In the eleventh aspect, the inertial sensor (10; 10A) further includes a base (61) having an arrangement surface (610a, 91). The arrangement surface (610a, 91) includes a main arrangement surface (610a) and a sub-arrangement surface (91) which are in different orientations. The first drive circuit (51) is on the sub-arrangement surface (91). The second drive circuit (52) is on the main arrangement surface (610a).

A twelfth aspect is an inertial sensor (10; 10A) referring to the second or third or eleventh aspect. In the thirteenth aspect, the base (61) includes an anti-vibration portion (70) lying between the main arrangement surface (610a) and the plurality of inertial force detection elements (40).

REFERENCE SIGNS LIST

10; 10A Inertial Sensor
30 Processor
40 Inertial Force Detection Element
41 First Inertial Force Detection Element (Sub-Inertial Force Detection Element)
42 Second Inertial Force Detection Element (Main Inertial Force Detection Element)
43 Third Inertial Force Detection Element (Main Inertial Force Detection Element)
44 Fourth Inertial Force Detection Element (Main Inertial Force Detection Element)
50 Drive Circuit
51 Drive Circuit (First Drive Circuit)
52; 52A Drive Circuit (Second Drive Circuit)
61 Base
610a Main Arrangement Surface
70 Anti-Vibration Portion
90 Tilted Part
91 Sub-Arrangement Surface
A21 First Axis (First Predetermined Axis)
A22 Second Axis (First Predetermined Axis)
A23 Third Axis (First Predetermined Axis)
A11 Second Predetermined Axis

The invention claimed is:

1. An inertial sensor comprising:
a plurality of inertial force detection elements each configured to output an output signal corresponding to a detected inertial force;
a processor configured to execute a process relating to the output signal from each of the plurality of inertial force detection elements; and
a base having an arrangement surface,
the plurality of inertial force detection elements including:
a plurality of main inertial force detection elements configured to detect inertial forces of a plurality of first predetermined axes orthogonal to each other and
a sub-inertial force detection element configured to detect an inertial force of a second predetermined axis which intersects the plurality of first predetermined axes such that the second predetermined axis is orthogonal to none of the plurality of first predetermined axes,
the arrangement surface including a main arrangement surface and a sub-arrangement surface which are in different orientations,
the plurality of main inertial force detection elements being on the main arrangement surface,
the sub-inertial force detection element being on the sub-arrangement surface, and
the base including:
a base part having a surface constituting the main arrangement surface and
a tilted part on the surface, the tilted part having a tilted surface constituting the sub-arrangement surface.

2. The inertial sensor of claim 1, wherein
the plurality of first predetermined axes are three axes orthogonal to one another.

3. The inertial sensor of claim 2, wherein
the processor is configured to perform failure diagnosis for the plurality of main inertial force detection elements with reference to an output signal from the sub-inertial force detection element.

4. The inertial sensor of claim 1, wherein
the processor is configured to perform failure diagnosis for the plurality of main inertial force detection elements with reference to an output signal from the sub-inertial force detection element.

5. The inertial sensor of claim 4, wherein
the processor is configured to, when a component of a specific first predetermined axis of the plurality of first predetermined axes obtainable from an inertial force based on the output signal from the sub-inertial force detection element does not match an inertial force based on an output signal from a specific main inertial force detection element corresponding to the specific first predetermined axis and included in the plurality of main inertial force detection elements, determine that the specific main inertial force detection element has a failure.

6. The inertial sensor of claim 4, wherein
the processor is configured to determine that at least one of the plurality of main inertial force detection elements has a failure when an inertial force based on the output signal from the sub-inertial force detection element does not match a component of a combined inertial force obtained by combining a plurality of output signals from the plurality of main inertial force detection elements.

7. The inertial sensor of claim 1, wherein
the processor is configured to, when a specific main inertial force detection element of the plurality of main inertial force detection elements has a failure, obtain an inertial force of a first predetermined axis corresponding to the specific main inertial force detection element and included in the plurality of first predetermined axes with reference to an output signal from the sub-inertial force detection element.

8. The inertial sensor of claim 1, wherein
each of the plurality of inertial force detection elements is a mechano-electrical transduction element.

9. The inertial sensor of claim 1, further comprising a plurality of drive circuits each configured to give the output signal from a corresponding one of the plurality of inertial force detection elements to the processor, wherein
the plurality of drive circuits includes
a first drive circuit configured to acquire a first output signal from the sub-inertial force detection element and give the first output signal to the processor and
a second drive circuit configured to acquire second output signals from the plurality of main inertial force detection elements and give the second output signals to the processor, and
the processor is configured to execute a process relating to the first output signal and the second output signals as the process relating to the output signal.

10. The inertial sensor of claim 9, wherein
the first drive circuit is on the sub-arrangement surface, and
the second drive circuit is on the main arrangement surface.

11. The inertial sensor of claim 10, wherein
the base includes an anti-vibration portion lying between the main arrangement surface and the plurality of inertial force detection elements.

* * * * *